US011220451B2

(12) United States Patent
Kunitomo et al.

(10) Patent No.: US 11,220,451 B2
(45) Date of Patent: Jan. 11, 2022

(54) GLASS PLATE HOUSING JIG AND METHOD FOR MANUFACTURING CHEMICALLY REINFORCED GLASS PLATE

(71) Applicant: Nippon Electric Glass Co., Ltd., Shiga (JP)

(72) Inventors: Kazunobu Kunitomo, Shiga (JP); Tatsuo Imai, Shiga (JP); Kiyotaka Kinoshita, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 1280 days.

(21) Appl. No.: 15/317,253

(22) PCT Filed: Jul. 14, 2015

(86) PCT No.: PCT/JP2015/070148
§ 371 (c)(1),
(2) Date: Dec. 8, 2016

(87) PCT Pub. No.: WO2016/027594
PCT Pub. Date: Feb. 25, 2016

(65) Prior Publication Data
US 2017/0137315 A1   May 18, 2017

(30) Foreign Application Priority Data

Aug. 19, 2014   (JP) .............................. JP2014-166513

(51) Int. Cl.
*C03B 35/14* (2006.01)
*B65D 85/48* (2006.01)
*C03C 21/00* (2006.01)

(52) U.S. Cl.
CPC .............. *C03B 35/14* (2013.01); *B65D 85/48* (2013.01); *C03C 21/001* (2013.01); *C03C 21/002* (2013.01)

(58) Field of Classification Search
CPC ..... C03B 35/14; C03C 21/001; C03C 21/002; B65D 85/48; B65D 85/00; B65D 85/30
See application file for complete search history.

(56) References Cited

U.S. PATENT DOCUMENTS 378,692 A * 2/1888 Latham ................... D06F 57/08
                                                                    211/198
990,454 A * 4/1911 Peters ..................... A47L 19/04
                                                                    211/41.5
(Continued)

FOREIGN PATENT DOCUMENTS

| JP | 2003-48733 | 2/2003 |
| JP | 2008-254735 | 10/2008 |

(Continued)

OTHER PUBLICATIONS

Enflish translation for JP2008-254735 (Year: 2008).*

(Continued)

*Primary Examiner* — Erin Snelting
(74) *Attorney, Agent, or Firm* — Wenderoth, Lind & Ponack, L.L.P.

(57) ABSTRACT

A glass sheet accommodating jig (1) accommodates a plurality of glass sheets (2) under a state in which the plurality of glass sheets (2) are arranged upright at intervals in a thickness direction in order to immerse the plurality of glass sheets (2) in a chemical tempering liquid. The glass sheet accommodating jig (1) includes a string-shaped body (7) being formed of at least one metal fiber. An end portion (2a) of the glass sheet (2) is supported by a V-shaped recess (7c) formed by intersection of a pair of string-shaped bodies (7a and 7b).

5 Claims, 2 Drawing Sheets

(56) References Cited

U.S. PATENT DOCUMENTS

| | | | | |
|---|---|---|---|---|
| 1,712,342 A * | 5/1929 | Fitzgerald | ............... | A47L 19/04 211/41.6 |
| 2,841,288 A * | 7/1958 | Field | ....................... | A47L 19/04 211/41.4 |
| 2,958,424 A * | 11/1960 | Bigatti | .................... | A47L 19/00 211/41.5 |
| 4,969,560 A * | 11/1990 | Stanfield | ............... | A47L 15/505 211/175 |
| 5,139,153 A * | 8/1992 | Delamare | ............. | B65D 81/05 206/521 |
| 5,333,970 A * | 8/1994 | Heselden | ................ | E04C 1/395 405/286 |
| 5,560,507 A * | 10/1996 | Arpin | ..................... | B65D 85/48 206/454 |
| 5,685,437 A * | 11/1997 | Lisec | ........................ | A47F 7/00 211/41 |
| 2006/0043032 A1 * | 3/2006 | McHugh | ................ | B65D 85/48 211/41.14 |
| 2007/0045204 A1 * | 3/2007 | Huard | .................... | B65D 85/48 211/41.14 |
| 2015/0345053 A1 * | 12/2015 | Skarbovig | ............. | E21D 11/003 405/302.3 |
| 2019/0106259 A1 * | 4/2019 | Wu | ........................ | B65D 85/48 |

FOREIGN PATENT DOCUMENTS

| | | |
|---|---|---|
| JP | 2009-18855 | 1/2009 |
| JP | 2013-184717 | 9/2013 |

OTHER PUBLICATIONS

International Preliminary Report on Patentability and Written Opinion of the International Searching Authority dated Feb. 21, 2017 in corresponding International (PCT) Application No. PCT/JP2015/070148.

International Search Report dated Sep. 8, 2015 in International (PCT) Application No. PCT/JP2015/070148.

* cited by examiner

GLASS PLATE HOUSING JIG AND METHOD FOR MANUFACTURING CHEMICALLY REINFORCED GLASS PLATE

TECHNICAL FIELD

The present invention relates to improved technologies of a glass sheet accommodating jig, which is configured to accommodate a plurality of glass sheets under a state in which the plurality of glass sheets are arranged upright at intervals in a thickness direction in order to immerse the plurality of glass sheets in a chemical tempering liquid, and a method of manufacturing a chemically tempered glass sheet.

BACKGROUND ART

As a method for enhancing a mechanical strength of a glass sheet, there has hitherto been used a method called chemical tempering. The chemical tempering involves immersing the glass sheet in a chemical tempering liquid to replace ions on a glass surface by ions in the chemical tempering liquid. Such replacement of ions generates compressive stress on the glass surface to enhance the mechanical strength.

The chemical tempering generally involves steps of preheating, tempering, and annealing in the stated order. The steps of chemical tempering is described in detail. First, in the preheating step, the glass sheet at normal temperature is air-heated to about 400° C. for 1 hour to 2 hours. Then, in the tempering step, the glass sheet is immersed in the chemical tempering liquid at about 400° C. for 2 hours to 4 hours. Finally, in the annealing step, the glass sheet is cooled to normal temperature over 3 hours to 4 hours.

Incidentally, in the steps of chemical tempering, when the glass sheet is immersed in the chemical tempering liquid in a chemical tempering tank, a glass sheet accommodating jig is used.

In the glass sheet accommodating jig, the glass sheet may be shaken by vibration during conveyance of the glass sheet or by the cooling air in the annealing step, and the glass sheet may be repeatedly brought into contact with support parts configured to support the glass sheet. As a result, there is a risk in that the glass sheet may be chipped and scratched.

In order to avoid such situation, for example, in a glass sheet accommodating jig of Patent Literature 1, a surface of a support part configured to support a glass sheet is covered with woven fabric.

CITATION LIST

Patent Literature: JP 2003-48733 A

SUMMARY OF INVENTION

Technical Problem

However, in the glass sheet accommodating jig disclosed in Patent Literature 1, when the glass sheet is pulled up from a chemical tempering liquid, the woven fabric made of stainless steel holds the chemical tempering liquid, and the chemical tempering liquid drips and adheres to an end portion of the glass sheet, which may cause stains. Further, the woven fabric made of stainless steel and the glass sheet stick to each other due to a solidified chemical tempering liquid (tempering salt). Therefore, when the woven fabric made of stainless steel and the glass sheet are separated from each other, there is a risk of causing cracks and scratches. Further, when the woven fabric holding the chemical tempering liquid and the glass sheet are held in contact with each other for a long period of time in the annealing step, ion exchange is locally accelerated. As a result, there is also a risk of inducing unevenness in chemical tempering.

In view of the above-mentioned circumstances, it is a technical object of the present invention to suppress stains on a glass sheet by a chemical tempering liquid and occurrence of unevenness in chemical tempering while preventing cracks and chips in the glass sheet.

Solution to Problem

According to one embodiment of the present invention, which has been devised to achieve the above-mentioned object, there is provided a glass sheet accommodating jig, which is configured to accommodate a plurality of glass sheets under a state in which the plurality of glass sheets are arranged upright at intervals in a thickness direction, the glass sheet accommodating jig comprising: a string-shaped body being formed of at least one metal fiber, wherein the string-shaped body is configured to support the glass sheet at an end portion of the glass sheet. Here, in addition to a string-shaped body obtained by twisting a plurality of metal fibers into a string shape, the string-shaped body may include one long metal fiber (wire), a plurality of metal fibers simply tied without being twisted, a plurality of metal fibers connected to each other under a state of being tied without being twisted, and the like, but metal fibers formed into a form of cloth, such as woven fabric and non-woven fabric (the same holds true hereinafter) are excluded.

In this configuration, the end portion of the glass sheet is supported by the string-shaped bodies. The string-shaped body is not in the form of cloth. Therefore, the contact area between the string-shaped body and the end portion of the glass sheet is small, and the amount of a chemical tempering liquid held by the string-shaped body after being pulled up from the chemical tempering liquid is also small. Therefore, after the glass sheet is pulled up from the chemical tempering liquid, the amount of the chemical tempering liquid that drips from the string-shaped body is also small, and the stains on the glass sheet caused by dripping of the chemical tempering liquid can be suppressed. Further, sticking of the glass sheet and the string-shaped body caused by a solidified chemical tempering liquid (tempering salt) is also minimized, and hence cracks and chips in the glass sheet can be prevented. Further, after the glass sheet is pulled up from the chemical tempering liquid, the situation in which the end portion of the glass sheet and the chemical tempering liquid are excessively held in contact with each other can also be avoided, and hence the occurrence of unevenness in chemical tempering can also be suppressed.

In the above-mentioned configuration, it is preferred that the string-shaped body comprise a plurality of twisted metal fibers.

In this configuration, cutting strength of the string-shaped body can be enhanced.

In any of the above-mentioned configurations, it is preferred that the end portion of the glass sheet be supported at a V-shaped recess formed by intersection of a pair of string-shaped bodies.

In this configuration, the end portion of the glass sheet is supported by the V-shaped recess. Therefore, the movement of the glass sheet is regulated, and hence the glass sheet can be supported more securely.

In the above-mentioned configuration, it is preferred that the pair of string-shaped bodies extend in the thickness direction in a zig-zag shape while intersecting with each other, and that a plurality of V-shaped recesses be formed in the thickness direction.

In this configuration, the plurality of V-shaped recesses can be easily formed in the thickness direction of the glass sheet. Further, the pair of string-shaped bodies extends to form the plurality of V-shaped recesses. Therefore, as compared to the case where the V-shaped recess is formed of an independent pair of string-shaped bodies, the tension on the V-shaped recesses can easily be made uniform. With this, the support forces of the V-shaped recesses with respect to the end portions of the glass sheets can be made uniform.

In the above-mentioned configuration, it is preferred that the pair of string-shaped bodies be fixed onto fixing members at apexes of the zig-zag shape.

In this configuration, the string-shaped bodies can easily be formed into the zig-zag shape. Further, even when the string-shaped body is cut between certain apexes, the string-shaped bodies between other apexes can be prevented from being loosened.

In any of the above-mentioned configurations, it is preferred that the glass sheet be supported by the string-shaped body configured to support the glass sheet at least at an upper end portion and both side end portions of the glass sheet.

In other words, unless any measures are taken, in the upper end portion and both side end portions of the glass sheet, the chemical tempering liquid is liable to drip from the support parts for the glass sheet toward the glass sheet after the glass sheet is pulled up from the chemical tempering liquid. Thus, in the above-mentioned configuration, the dripping of the chemical tempering liquid from the glass support parts toward the glass sheet can be effectively suppressed.

According to one embodiment of the present invention, which has been devised to achieve the above-mentioned object, there is provided a method of manufacturing a chemically tempered glass sheet, comprising: an immersion step of immersing a plurality of glass sheets in a chemical tempering liquid under a state in which the plurality of glass sheets are arranged upright at intervals in a thickness direction, wherein, in the immersion step, a string-shaped body being formed of at least one metal fiber supports the glass sheet at an end portion of the glass sheet.

In this configuration, there can be obtained substantially the same actions and effects as those described in the beginning of Description.

Advantageous Effects of Invention

According to the above-mentioned invention, it is possible to suppress the stains on the glass sheet by the chemical tempering liquid and the occurrence of unevenness in chemical tempering while preventing cracks and chips in the glass sheet.

DESCRIPTION OF EMBODIMENTS

Now, an embodiment of the present invention is described with reference to the drawings.

Figure 1:
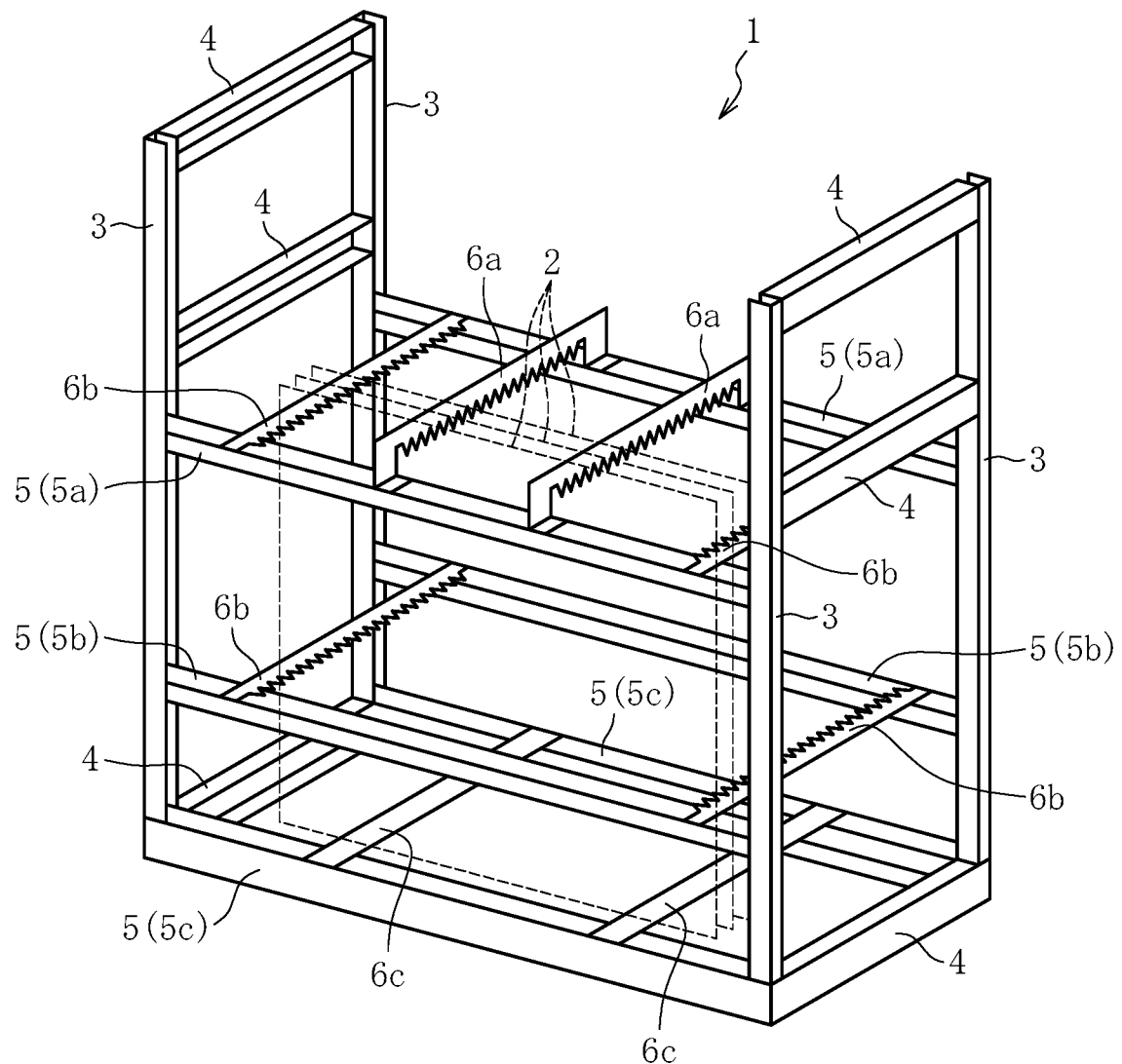
FIG. 1 is a perspective view for illustrating a glass sheet accommodating jig according to an embodiment of the present invention.

FIG. 1 is a perspective view for illustrating a glass sheet accommodating jig 1 according to the embodiment of the present invention. The glass sheet accommodating jig 1 accommodates a plurality of glass sheets 2 under a state in which the plurality of glass sheets 2 are arranged upright at intervals in a thickness direction in order to immerse the plurality of glass sheets 2 in a chemical tempering liquid.

In this embodiment, the glass sheet 2 has a rectangular shape and has dimensions of, for example, 1 m×1 m or more. As a matter of course, the glass sheet 2 may have dimensions smaller than those dimensions. Further, the glass sheet 2 has a thickness of, for example, from 0.05 mm to 2.00 mm, but the thickness is not limited thereto.

For convenience of description, in this embodiment, a thickness direction of the glass sheet 2 of FIG. 1 is defined as a front-back direction. A frontward side of FIG. 1 is defined as a front side, and a backward side thereof is defined as a back side. A vertical direction and a horizontal direction are defined as a vertical direction and a horizontal direction of the glass sheet 2.

In this embodiment, the glass sheet accommodating jig 1 is in a form of frames. The glass sheet accommodating jig 1 surrounds the periphery of the plurality of arranged glass sheets 2 and forms a space for accommodating the glass sheets 2.

In this embodiment, the glass sheet accommodating jig 1 includes columns 3 that are arranged at corners of a rectangular shape in plan view and extend in the vertical direction, a plurality of beams 4 that extend in the front-back direction between the columns 3 to connect the columns 3, and a plurality of girders 5 that extend in the horizontal direction between the columns 3 to connect the columns 3.

In this embodiment, the girders 5 include a pair of upper girders 5a configured to connect the columns 3 to each other at intermediate portions in the vertical direction, a pair of intermediate girders 5b arranged below the upper girders 5a, and a pair of lower girders 5c configured to connect lower end portions of the columns 3 to each other in the vertical direction. There are arranged the pair of upper girders 5a at the same height, the pair of intermediate girders 5b at the same height, and the pair of lower girders 5c at the same height on front and back sides of the glass sheet accommodating jig 1.

Further, the glass sheet accommodating jig 1 includes support parts configured to support the glass sheets 2. The support parts include a pair of upper support parts 6a configured to support an upper end portion of each glass sheet 2 from an upper side, two pairs of side support parts 6b configured to support side end portions on both sides of each glass sheet 2 from sides, and a pair of lower support parts 6c configured to support a lower end portion of each glass sheet 2 from a lower side. The number of the upper support parts 6a and the number of the side support parts 6b are not particularly limited and may appropriately be changed in accordance with the dimensions of the glass sheet 2 and the like.

Both ends in the front-back direction of the upper support parts 6a are removably mounted to upper surfaces of the pair of upper girders 5a with fastening members such as bolts (not shown).

Both ends in the front-back direction of one pair of the two pairs of side support parts 6b are fixed onto the upper surfaces of the pair of upper girders 5a with fastening members such as bolts (not shown). Both ends in the front-back direction of another pair of the two pairs of side support parts 6b are fixed onto upper surfaces of the pair of intermediate girders 5b with fastening members such as bolts (not shown).

Both ends in the front-back direction of the lower support parts 6c are fixed onto upper surfaces of the pair of lower girders 5c with fastening members such as bolts (not shown).

Figure 2:
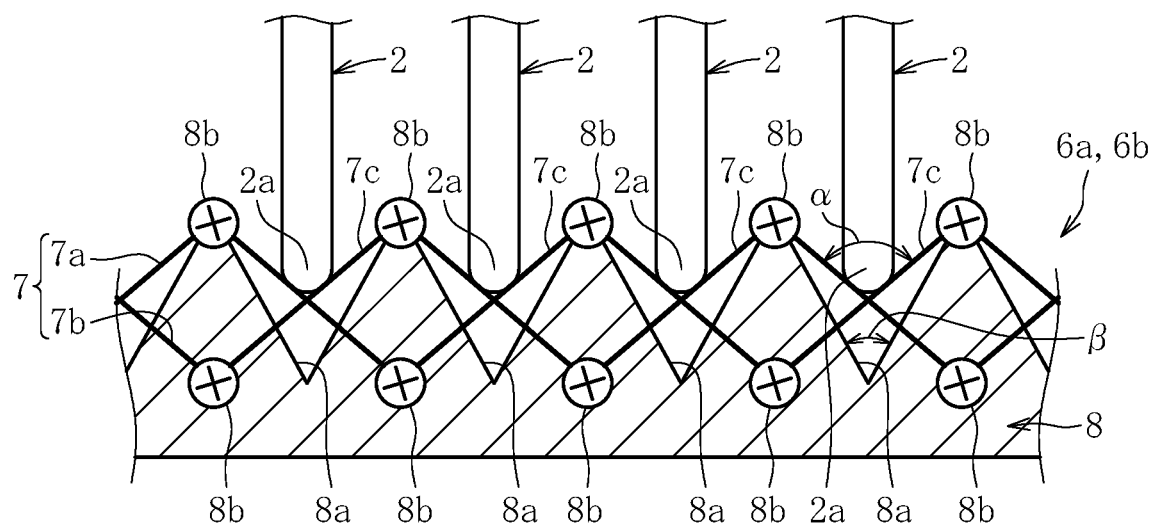
FIG. 2 is a schematic view for illustrating a state in which an end portion of each glass sheet is supported by an upper support part and a side support part.

As illustrated in FIG. 2, the upper support parts 6a and the side support parts 6b are each mainly formed of a string-shaped body 7 configured to support the end portion 2a of each glass sheet 2 and a fixing member 8 configured to fix the string-shaped body 7. The fixing member 8 includes V-shaped grooves 8a formed at predetermined intervals in the front-back direction.

Meanwhile, although not shown, in this embodiment, each of the lower support parts 6c includes a flat sheet member and metallic woven fabric fixed onto the flat sheet member. The lower support parts 6c are configured to support the end portion 2a of the glass sheet 2 with the metallic woven fabric. The metallic woven fabric is fixed onto the flat sheet member under a state of being arranged on the flat sheet member and wound with the string-shaped body 7.

In this embodiment, the string-shaped body 7 is formed by twisting a plurality of metal fibers. The diameter of the string-shaped body 7 is, for example, preferably from 0.2 mm to 1.0 mm, more preferably from 0.3 mm to 0.9 mm, most preferably from 0.4 mm to 0.8 mm. When the diameter of the string-shaped body 7 is less than 0.2 mm, there is a risk in that the strength of the string-shaped body 7 may be insufficient. When the diameter of the string-shaped body 7 is more than 1.0 mm, there is a risk in that the flexibility may be insufficient.

The diameter of the metal fiber forming the string-shaped body 7 is, for example, preferably from 8 μm to 16 μm, more preferably from 9 μm to 15 μm, most preferably from 10 μm to 14 μm. When the diameter of the metal fiber is less than 8 μm, there is a risk in that the strength may be insufficient. When the diameter of the metal fiber is more than 16 μm, there is a risk in that the flexibility may be insufficient.

There is no particular limitation on a material for the metal fiber forming the string-shaped body 7 as long as the material is excellent in heat resistance, has corrosion resistance to a chemical tempering liquid, and does not allow an impurity to be eluted. As such material, there are given, for example, stainless steel such as SUS304 and SUS316. The foregoing similarly applies to the metal fiber forming the metallic woven fabric of the lower support parts 6c. The forgoing also applies to a material for each part of the glass sheet accommodating jig 1 other than the string-shaped body 7 and the metallic woven fabric.

In this embodiment, a pair of string-shaped bodies 7a and 7b each extends in the front-back direction while meandering in a zig-zag shape. The pair of string-shaped bodies 7a and 7b intersects with each other at a plurality of portions in the front-back direction. The pair of string-shaped bodies 7a and 7b is fixed onto the fixing member 8 at apexes in the zig-zag shape, for example, with fastening members such as bolts 8b and washers. In this embodiment, the pair of string-shaped bodies 7a and 7b is connected at one end to form a part of one long string-shaped body 7.

In this embodiment, the flexion angle of the zig-zag shape of the string-shaped body 7a and the dimensions of a straight portion thereof are constant, and the flexion angle of the zig-zag shape of the string-shaped body 7b and the dimensions of a straight portion thereof are constant. Further, the flexion angle of the zig-zag shape of the string-shaped body 7a and the flexion angle of the zig-zag shape of the string-shaped body 7b are the same, and the dimensions of the straight portion in the zig-zag shape of the string-shaped body 7a and the dimensions of the straight portion in the zig-zag shape of the string-shaped body 7b are the same.

The string-shaped bodies 7a and 7b are arranged so that center lines (straight lines in the front-back direction) in a width direction of each zig-zag shape overlap each other. Further, the string-shaped bodies 7a and 7b are arranged so that each zig-zag shape is symmetrical with the overlapping center lines being a symmetry axis.

The end portion 2a of the glass sheet 2 is supported by a V-shaped recess 7c formed in the periphery of an intersecting portion of the pair of string-shaped bodies 7a and 7b. In this embodiment, the pair of string-shaped bodies 7a and 7b is held in contact with each other at the intersecting portion. However, as long as the end portion 2a of the glass sheet 2 can be supported by the V-shaped recesses 7c, the pair of string-shaped bodies 7a and 7b need not be held in contact with each other. In the illustrated example, the end portion 2a of the glass sheet 2 is in a rounded state. However, the present invention is not limited thereto, and for example, the end portion 2a may have an angled shape, a chamfered shape, or the like.

An angle α of the V-shape in the V-shaped recess 7c is preferably 120° or less, more preferably 90° or less. When the angle α is more than 120°, the movement of the end portion 2a of the glass sheet 2 cannot be regulated, and there is a risk in that the end portion 2a of the glass sheet 2 may not be supported securely. The angle α of the V-shape in the V-shaped recess 7c is set to be larger than an angle β of a V-shape in the groove 8a.

In this embodiment, the positions of the V-shaped recess 7c and the groove 8a of the fixing member 8 in the front-back direction are the same. When the end portion 2a of the glass sheet 2 is supported by the V-shaped recesses 7c as in the illustrated example, there is a gap between the end portion 2a of the glass sheet 2 and the groove 8a. Thus, even when the glass sheet 2 moves slightly in the front-back direction due to small vibration or the like, the end portion 2a of the glass sheet 2 is not brought into contact with the groove 8a, and the end portion 2a of the glass sheet 2 is not damaged. Meanwhile, when the glass sheet 2 is to move significantly in the front-back direction due to large vibration or the like, or when the string-shaped body 7 is cut, the position of the end portion 2a of the glass sheet 2 in the front-back direction is regulated by the groove 8a of the fixing member 8. As a result, the situation in which the glass sheet 2 is brought into contact with the adjacent glass sheet 2 can be avoided.

Next, a method of manufacturing a chemically tempered glass sheet according to the embodiment of the present invention is described.

In this embodiment, the method of manufacturing a chemically tempered glass sheet includes a preheating step, a tempering step (immersion step), and an annealing step.

First, the plurality of glass sheets 2 are set in the glass sheet accommodating jig 1 having the upper support parts 6a removed therefrom under a state in which the plurality of glass sheets 2 are arranged upright at intervals in the thickness direction at normal temperature. Then, the upper support parts 6a are mounted to the glass sheet accommodating jig 1. With this, the upper end portion and both side end portions of each glass sheet 2 are supported by the string-shaped bodies 7.

Then, in the preheating step, the glass sheet accommodating jig 1 accommodating the glass sheets 2 is air-heated to about 400° C. for about 1 hour to about 2 hours so that the glass sheets 2 at normal temperature are heated to about 400° C.

After the preheating step, in the tempering step, the glass sheet accommodating jig 1 accommodating the glass sheets 2 is immersed in the chemical tempering liquid at about 400° C. for 2 hours to 4 hours, to thereby chemically temper the glass sheets 2.

After the tempering step (after the glass sheet accommodating jig 1 is pulled up from the chemical tempering liquid), in the annealing step, the glass sheet accommodating jig 1 accommodating the glass sheets 2 is cooled to normal temperature over 3 hours to 4 hours so that the glass sheets 2 are cooled to normal temperature.

After the annealing step, at normal temperature, the upper support parts 6a are removed from the glass sheet accommodating jig 1, and the glass sheets 2 are removed from the glass sheet accommodating jig 1. With this, the chemically tempered glass sheets 2 are obtained, and the method of manufacturing a chemically tempered glass sheet according to this embodiment is completed.

In the glass sheet accommodating jig 1 configured as described above, the end portion 2a of each glass sheet 2 is supported by the string-shaped body 7. The contact area between the string-shaped body 7 and the end portion 2a of the glass sheet 2 is small, and the amount of the chemical tempering liquid held by the string-shaped body 7 after being pulled up from the chemical tempering liquid is also small. Therefore, after the glass sheet 2 is pulled up from the chemical tempering liquid, the amount of the chemical tempering liquid that drips from the string-shaped body 7 is also small, and the stains on the glass sheet 2 caused by the dripping of the chemical tempering liquid can be suppressed. Further, sticking of the glass sheet 2 and the string-shaped body 7 caused by the solidified chemical tempering liquid (tempering salt) is also minimized, and hence cracks and chips in the glass sheet 2 can be prevented. Further, after the glass sheet 2 is pulled up from the chemical tempering liquid, the situation in which the end portion 2a of the glass sheet 2 and the chemical tempering liquid are excessively held in contact with each other can also be avoided, and hence the occurrence of unevenness in chemical tempering can also be suppressed. In addition, the string-shaped body 7 is formed of a metal fiber, and hence has predetermined flexibility. Thus, even when the glass sheet 2 is repeatedly brought into contact with the string-shaped body 2, the risk of causing chips and scratches in the glass sheet 2 is reduced. As such, in the glass sheet accommodating jig 1 according to this embodiment, the stains on the glass sheet 2 caused by the chemical tempering liquid and the occurrence of unevenness in chemical tempering can be suppressed while cracks and chips in the glass sheet 2 are prevented.

The present invention is not limited to the above-mentioned embodiment and may be modified variously within the scope of the technical concept. For example, in the above-mentioned embodiment, the lower support parts 6c support the lower end portion of the glass sheet 2 with the metallic woven fabric, but the lower support parts 6c may also support the lower end portion of the glass sheet 2 with the string-shaped body 7.

REFERENCE SIGNS LIST 1 glass sheet accommodating jig
2 glass sheet
2a end portion
7, 7a, 7b string-shaped body
7c V-shaped recess
8 fixing member

The invention claimed is:

1. A glass sheet accommodating jig, which is in a form of frames and configured to accommodate a plurality of glass sheets under a state in which the plurality of glass sheets are arranged upright at intervals in a thickness direction, the glass sheet accommodating jig comprising:
   a plurality of columns that extend in a vertical direction;
   a plurality of girders that extend in a horizontal direction parallel to the glass sheets, the plurality of girders being located between the plurality of columns to connect the plurality of columns; and
   a plurality of support parts that extend in the thickness direction, each of the plurality of support parts being fixed to the plurality of girders,
   wherein each of the plurality of support parts includes a pair of string-shaped bodies and a fixing member onto which the pair of string-shaped bodies are fixed, each of the pair of string-shaped bodies comprising a plurality of twisted metal fibers, and
   wherein, for each of the plurality of support parts, the pair of string-shaped bodies are fixed onto the fixing member to extend in the thickness direction in a zig-zag shape while intersecting with each other to form a plurality of V-shaped recesses in the thickness direction configured to support the glass sheets at end portions of the glass sheets.

2. The glass sheet accommodating jig according to claim 1, wherein, for each of the plurality of support parts, the pair of string-shaped bodies are fixed onto the fixing member at apexes of the zig-zag shape.

3. The glass sheet accommodating jig according to claim 1, wherein at least an upper end portion and a pair of side end portions of each of the glass sheets are respectively supported by the pair of string-shaped bodies of any one of the plurality of support parts.

4. A method of manufacturing a chemically tempered glass sheet, the method comprising:
   an immersion step of immersing a plurality of glass sheets in a chemical tempering liquid under a state in which the plurality of glass sheets are arranged upright at intervals in a thickness direction by using the glass sheet accommodating jig according to claim 1,
   wherein, in the immersion step, the string-shaped bodies support the plurality of glass sheets at the end portions of the glass sheets.

5. A chemical tempering tank comprising the glass sheet accommodating jig according to claim 1.

* * * * *